W. ZIERATH.
Wheels for Vehicles.

No. 155,567.  Patented Sept. 29, 1874.

Attest.
Edward Barthel

Inventor:
W. Zierath
By Attorney
Thos. S. Sprague

UNITED STATES PATENT OFFICE.

WILLIAM ZIERATH, OF SHEBOYGAN, WISCONSIN.

IMPROVEMENT IN WHEELS FOR VEHICLES.

Specification forming part of Letters Patent No. 155,567, dated September 29, 1874; application filed August 7, 1874.

*To all whom it may concern:*

Be it known that I, WILLIAM ZIERATH, of Sheboygan, in the county of Sheboygan and State of Wisconsin, have invented an Improvement in Carriage-Wheels, of which the following is a specification:

The nature of this invention relates to an improvement in wheels of that class whose spoke-tenons are clamped between the flanges of a metallic hub, which is cast in two parts. The object of the invention is to form one half of the hub and the box in one piece, and the other half in another, to screw onto the projecting end of the box, firmly clamping the tenons of the spokes, which are also dovetailed in recesses formed in the inner faces of the hub-flanges.

Figure 1:
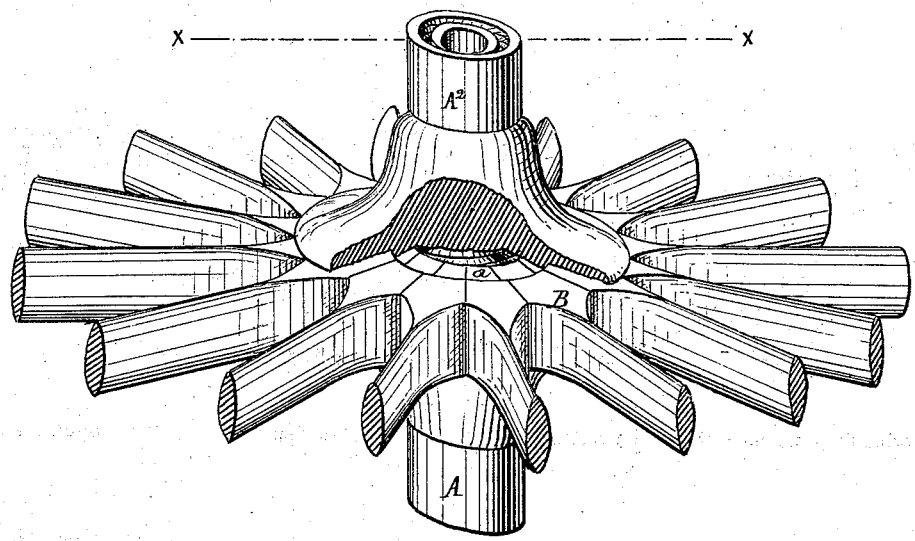
Figure 2:
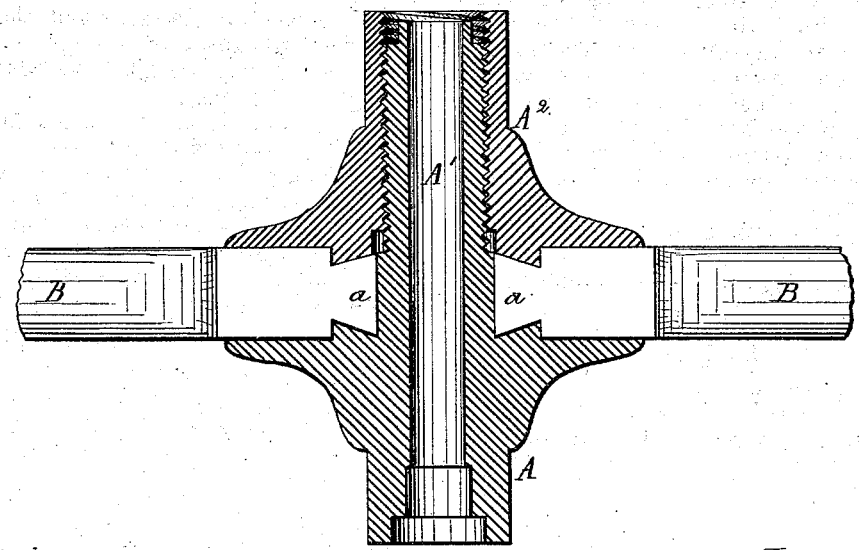

Figure 1 is a perspective view of the central portion of a wheel, with a portion of the hub broken away. Fig. 2 is a longitudinal section at $x\ x$.

In the drawing, A represents the inner part of the hub, with which is cast in one piece the axle-box $A^1$, the projecting end of which is externally threaded, to receive the flange-nut $A^2$, which forms the outer half of the hub, and which projects a trifle beyond the outer end of the box. The wheel is secured on the axle by a nut on the outer end of the latter, which is screwed on an end projecting beyond the hub. The spokes B are beveled at the shank, so that when laid between the flanges they form a circle of solid wood. The tenons are dovetailed at $a\ a$ on their inner ends, which dovetails are received in a half-dovetail recess turned in each hub-flange, which thereby prevents the withdrawal of any spoke, while the tenons are firmly clamped without bolting through the flanges.

What I claim as my invention, and desire to secure by Letters Patent, is—

The flanged hub-section A, provided with the box $A^1$, externally threaded to receive the flanged nut $A^2$, the sections having plain and dovetailed recesses, to receive the corresponding tenons $a$ of the spokes B, all combined substantially as described.

WILLIAM ZIERATH.

Witnesses:
J. Q. ADAMS,
J. A. GASS.